United States Patent
Yoshida et al.

(10) Patent No.: US 8,268,172 B2
(45) Date of Patent: Sep. 18, 2012

(54) WASTE FLUID TREATING APPARATUS

(75) Inventors: Miki Yoshida, Ota-Ku (JP); Takeshi Furonaka, Ota-ku (JP)

(73) Assignee: Disco Corporation, Tokyo (JP)

( * ) Notice: Subject to any disclaimer, the term of this patent is extended or adjusted under 35 U.S.C. 154(b) by 299 days.

(21) Appl. No.: 12/842,302

(22) Filed: Jul. 23, 2010

(65) Prior Publication Data

US 2011/0042291 A1 Feb. 24, 2011

(30) Foreign Application Priority Data

Aug. 19, 2009 (JP) ................................ 2009-190320

(51) Int. Cl.
*B01D 36/02* (2006.01)
(52) U.S. Cl. ............... 210/257.1; 210/258; 210/259; 210/266; 210/288; 210/290; 210/502.1; 210/167.31; 210/171
(58) Field of Classification Search .......... 210/167.31, 210/171, 257.1, 258, 259, 262, 266, 288, 210/290, 502.1, 686
See application file for complete search history.

(56) References Cited

U.S. PATENT DOCUMENTS

| | | | | |
|---|---|---|---|---|
| 3,750,847 A | * | 8/1973 | Sluhan | 184/109 |
| 4,648,976 A | * | 3/1987 | Chen | 210/678 |
| 4,764,271 A | * | 8/1988 | Acosta | 210/86 |
| 4,784,763 A | * | 11/1988 | Hambleton et al. | 210/90 |
| 4,851,122 A | * | 7/1989 | Stanley | 210/501 |
| 4,855,043 A | * | 8/1989 | Dalton | 210/190 |
| 5,993,663 A | * | 11/1999 | Maidagan Larrumbide | 210/666 |
| 6,106,728 A | * | 8/2000 | Iida et al. | 210/743 |
| 6,746,309 B2 | * | 6/2004 | Tsuihiji et al. | 451/28 |
| 8,017,003 B2 | * | 9/2011 | Furonaka et al. | 210/134 |

FOREIGN PATENT DOCUMENTS

JP 2004-230527 8/2004

* cited by examiner

*Primary Examiner* — Matthew Savage
(74) *Attorney, Agent, or Firm* — Greer, Burns & Crain, Ltd.

(57) ABSTRACT

A waste fluid treating apparatus including a pure water generating unit including an ion exchanger for purifying a fresh water sent by a fresh water pump to obtain a pure water. The ion exchanger includes a housing, an anion exchange resin layer accommodated in the housing, and a mixed resin layer accommodated in the housing. The anion exchange resin layer is composed of only anion exchange resin, and the mixed resin layer is composed of a mixture of anion exchange resin and cation exchange resin. The housing is provided with a fresh water inlet for introducing the fresh water into the anion exchange resin layer and a pure water outlet for discharging the pure water from the mixed resin layer.

3 Claims, 6 Drawing Sheets

WASTE FLUID TREATING APPARATUS

BACKGROUND OF THE INVENTION

1. Field of the Invention

The present invention relates to a waste fluid treating apparatus attached to a processing apparatus such as a cutting apparatus for cutting a workpiece such as a semiconductor wafer to treat a waste fluid generated from a process fluid supplied in processing.

2. Description of the Related Art

In a semiconductor device fabrication process, a plurality of crossing division lines called streets are formed on the front side of a substantially disk-shaped semiconductor wafer to partition a plurality of areas where devices such as ICs and LSIs are respectively formed. The semiconductor wafer is cut along the streets to divide these areas from each other along the streets, thereby producing the individual semiconductor devices. Further, also in an optical device wafer, the front side of a sapphire substrate is partitioned into a plurality of areas by a plurality of crossing streets, and a gallium nitride compound semiconductor or the like is layered in each of these partitioned areas to thereby form an optical device in each area. Such an optical device wafer is cut along the streets to obtain individual optical devices such as light emitting diodes and laser diodes, which are widely used for electrical equipment.

Cutting of the semiconductor wafer and the optical device wafer mentioned above along the streets is usually performed by using a cutting apparatus called a dicer. This cutting apparatus includes a chuck table for holding a workpiece such as a semiconductor wafer, cutting means including a cutting blade for cutting the workpiece held on the chuck table, and process water supplying means for supplying a process water to the cutting blade, wherein the process water is supplied to the cutting blade under rotation by the process water supplying means, thereby cooling the cutting blade, and the process water is also supplied to a cut area of the workpiece to be cut by the cutting blade in a cutting operation.

In the cutting operation, a waste fluid left after cutting silicon or gallium nitride compound semiconductor contains chips due to cutting. Such a waste fluid containing the chips of semiconductor materials causes environmental pollution, and the chips are therefore removed from the waste fluid by using a waste fluid treating apparatus. Thereafter, the waste fluid is reused or put to disposal (see Japanese Patent Laid-open No. 2004-230527, for example).

The waste fluid treating apparatus mentioned above includes a waste fluid tank for storing a waste fluid generated from a process fluid supplied in processing by a cutting apparatus, a waste fluid pump for sending the waste fluid stored in the waste fluid tank, waste fluid filtering means for filtering the waste fluid sent by the waste fluid pump to obtain a fresh water, a fresh water tank for storing the fresh water obtained by the waste fluid filtering means, a fresh water pump for sending the fresh water stored in the fresh water tank, and pure water generating means including an ion exchanger for purifying the fresh water sent by the fresh water pump to obtain a pure water.

SUMMARY OF THE INVENTION

The ion exchanger included in the pure water generating means of the waste fluid treating apparatus uses a mixture of anion exchange resin and cation exchange resin. However, the life of this mixture is short, resulting in poor economy.

It is therefore an object of the present invention to provide a waste fluid treating apparatus which can extend the life of the ion exchanger included in the pure water generating means.

In accordance with an aspect of the present invention, there is provided a waste fluid treating apparatus including a waste fluid tank for storing a waste fluid generated from a process fluid supplied in processing by a processing apparatus; a waste fluid pump for sending said waste fluid stored in said waste fluid tank; waste fluid filtering means for filtering said waste fluid sent by said waste fluid pump to obtain a fresh water; a fresh water tank for storing said fresh water obtained by said waste fluid filtering means; a fresh water pump for sending said fresh water stored in said fresh water tank; and pure water generating means including an ion exchanger for purifying said fresh water sent by said fresh water pump to obtain a pure water; said ion exchanger including a housing, an anion exchange resin layer accommodated in said housing, and a mixed resin layer accommodated in said housing, said anion exchange resin layer being composed of only anion exchange resin, said mixed resin layer being composed of a mixture of anion exchange resin and cation exchange resin; said housing being provided with fresh water inlet means for introducing said fresh water into said anion exchange resin layer and pure water outlet means for discharging said pure water from said mixed resin layer.

Preferably, the weight ratio of said anion exchange resin forming said anion exchange resin layer and said mixture forming said mixed resin layer is set to 3:2 to 4:1. More preferably, the weight ratio of said anion exchange resin and said cation exchange resin forming said mixed resin layer is set to 3:2.

The ion exchanger included in the pure water generating means of the waste fluid treating apparatus according to the present invention includes the anion exchange resin layer composed of only anion exchange resin and the mixed resin layer composed of a mixture of anion exchange resin and cation exchange resin. Further, the fresh water is introduced into the anion exchange resin layer, and the pure water is discharged from the mixed resin layer. Accordingly, the waste fluid generated by cutting or grinding a semiconductor containing more anions can be effectively converted into the pure water, and the life of the ion exchanger can be extended.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
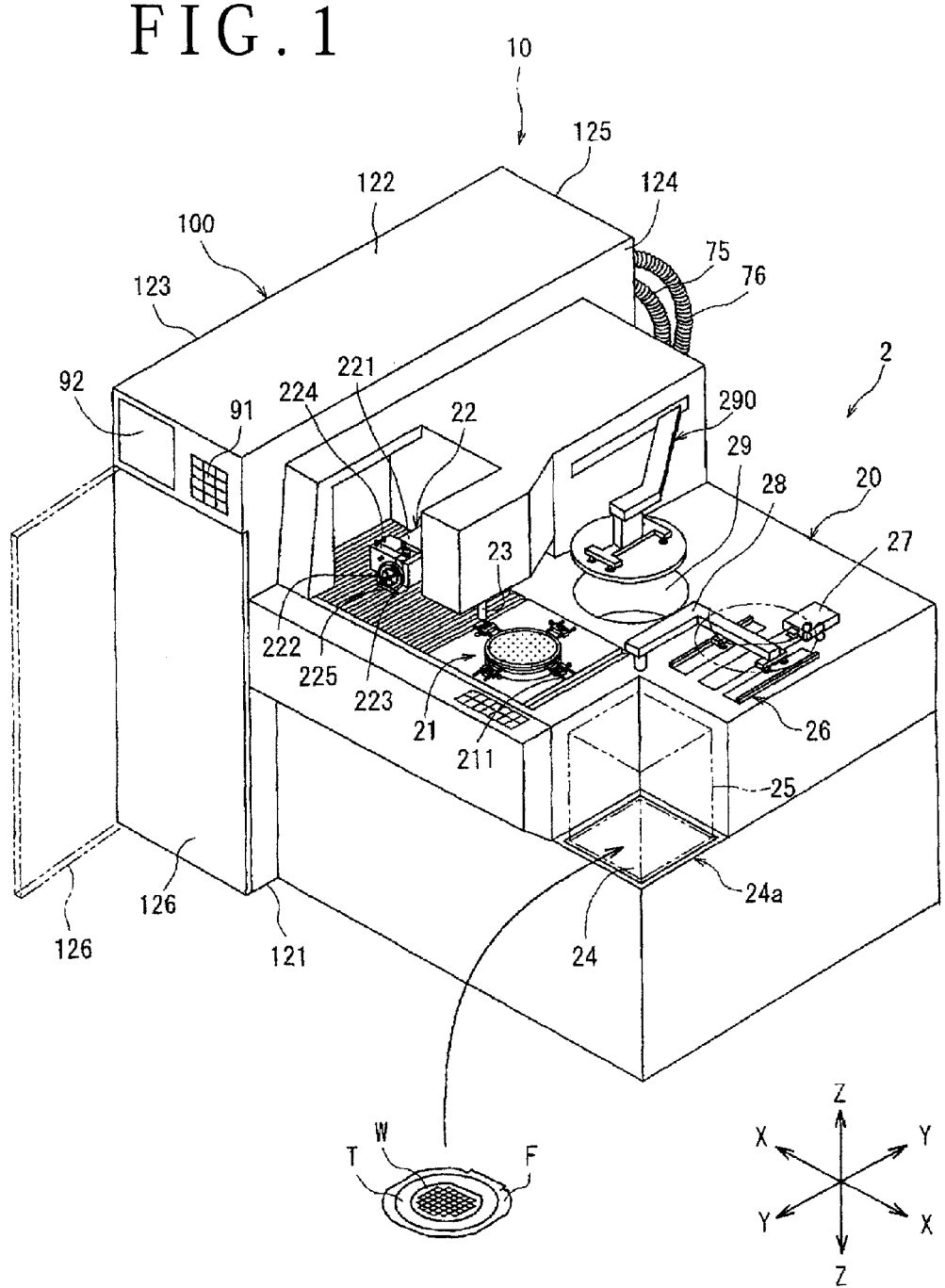
FIG. 1 is a perspective view showing the condition that a waste fluid treating apparatus according to the present invention is provided adjacent to a cutting apparatus as a processing apparatus.

A preferred embodiment of the waste fluid treating apparatus according to the present invention will now be described in detail with reference to the attached drawings. Referring to FIG. 1, there is shown a perspective view of a waste fluid treating apparatus 10 provided adjacent to a cutting apparatus 2 as a processing apparatus. The cutting apparatus 2 has a substantially boxlike unit housing 20. The unit housing 20 contains a chuck table 21 for holding a workpiece. The chuck table 21 is movable in the work feeding direction shown by an arrow X in FIG. 1. The chuck table 21 has an upper surface as a holding surface for holding a workpiece, wherein the workpiece placed on the upper surface of the chuck table 21 is held under suction by suction means (not shown). Further, the chuck table 21 is rotatable by a rotating mechanism (not shown). The chuck table 21 is provided with a plurality of clamps 211 for fixing an annular frame for supporting a wafer as the workpiece through a dicing tape to be hereinafter described. The chuck table 21 is movable by feeding means (not shown) in the work feeding direction shown by the arrow X.

The cutting apparatus 2 shown in FIG. 1 includes a spindle unit 22 as cutting means. The spindle unit 22 is movable in the indexing direction shown by an arrow Y in FIG. 1 by indexing means (not shown) and also movable in the tool feeding direction shown by an arrow Z in FIG. 1 by tool feeding means (not shown). The spindle unit 22 includes a spindle housing 221 mounted on a moving base (not shown) so as to be movable both in the indexing direction shown by the arrow Y and in the tool feeding direction shown by the arrow X, a rotating spindle 222 rotatably supported to the spindle housing 221, and a cutting blade 223 mounted at the front end of the rotating spindle 222. A blade cover 224 for covering the upper half portion of the cutting blade 223 is mounted on the front end of the spindle housing 221. The blade cover 224 is provided with a process fluid supply nozzle 225 for spraying a process fluid toward the cutting blade 223. The process fluid supply nozzle 225 is connected to process fluid supplying means (not shown).

The cutting apparatus 2 shown in FIG. 1 further includes imaging means 23 for imaging the upper surface of the workpiece held on the chuck table 21 to detect a region to be cut by the cutting blade 223. The imaging means 23 is provided by optical means such as a microscope and a CCD camera. The unit housing 20 is provided with a cassette setting area 24a where a cassette table 24 is provided. A cassette 25 for storing a semiconductor wafer W as a workpiece is set on the cassette table 24. The cassette table 24 is vertically movable by lifting means (not shown). The semiconductor wafer W stored in the cassette 25 has a plurality of crossing streets on the front side to thereby partition a plurality of rectangular regions where a plurality of devices such as ICs and LSIs are respectively formed. The semiconductor wafer W is stored in the cassette 25 in the condition where the back side of the wafer W is attached to the adhesive surface of a dicing tape T supported to an annular frame F.

The cutting apparatus 2 shown in FIG. 1 further includes work ejecting/inserting means 27 for ejecting the semiconductor wafer W (supported through the dicing tape T to the annular frame F) from the cassette 25 set on the cassette table 24 to a temporary setting table 26 before processing and inserting the semiconductor wafer W from the temporary setting table 26 into the cassette 25 after processing. The cutting apparatus 2 further includes first carrying means 28 for carrying the semiconductor wafer W from the temporary setting table 26 to the chuck table 21 before processing, cleaning means 29 for cleaning the semiconductor wafer W cut on the chuck table 21, and second carrying means 290 for carrying the semiconductor wafer W from the chuck table 21 to the cleaning means 29 after processing.

The operation of the cutting apparatus 2 shown in FIG. 1 will now be described in brief. The semiconductor wafer W (supported through the dicing tape T to the annular frame F) stored at a predetermined position in the cassette 25 set on the cassette table 24 is moved to an ejecting position by operating the lifting means to vertically move the cassette table 24. The semiconductor wafer W at the ejecting position is next ejected to the temporary setting table 26 by operating (advancing and retracting) the work ejecting/inserting means 27. The semiconductor wafer W on the temporary setting table 26 is next carried to the chuck table 21 by swiveling the first carrying means 28. The semiconductor wafer W placed on the chuck table 21 is next held under suction on the chuck table 21 by operating the suction means. AT this time, the annular frame F supporting the semiconductor wafer W through the dicing tape T is fixed by the clamps 211. The chuck table 21 holding the semiconductor wafer W is next moved to a position just under the imaging means 23. At this position, the streets formed on the semiconductor wafer W are detected by the imaging means 23. Thereafter, the spindle unit 22 is moved in the indexing direction shown by the arrow Y to precisely align the cutting blade 223 to a predetermined one of the streets detected above.

Thereafter, the cutting blade 223 is moved in the tool feeding direction shown by the arrow Z by a predetermined amount while it is rotated in a predetermined direction. Further, the chuck table 21 holding the semiconductor wafer W is moved in the work feeding direction shown by the arrow X (perpendicular to the axis of rotation of the cutting blade 223) at a predetermined feed speed. Accordingly, the semiconductor wafer W held on the chuck table 21 is cut along the predetermined street by the cutting blade 223 (cutting step). In this cutting step, the process fluid supplying means is operated to spray the process fluid from the process fluid supply nozzle 225 toward a cut area (street) of the semiconductor wafer W to be cut by the cutting blade 223. After cutting the semiconductor wafer W along the predetermined street, the chuck table 21 is relatively moved in the indexing direction shown by the arrow Y by the pitch of the streets to similarly perform the above cutting step along the adjacent street. After performing the above cutting step along all the streets extending in a first direction on the semiconductor wafer W, the chuck table 21 is rotated 90° C. to similarly perform the above cutting step along all the other streets extending in a second direction perpendicular to the first direction. As a result, the semiconductor wafer W is cut along all the streets extending in the first and second directions to obtain a plurality of individual chips. These individual chips remain attached to the dicing tape T and supported to the annular frame F in the form of the wafer.

After performing the cutting step along all the streets of the semiconductor wafer W as mentioned above, the chuck table 21 holding the semiconductor wafer W is returned to the initial position shown in FIG. 1, and the suction holding of the semiconductor wafer W on the chuck table 21 is canceled at this position. The semiconductor wafer W is next carried from the chuck table 21 to the cleaning means 29 by operating the second carrying means 290. The semiconductor wafer W is next cleaned and dried by the cleaning means 29. The semiconductor wafer W thus cleaned and dried is next carried from the cleaning means 29 to the temporary setting table 26 by operating the first carrying means 28. The semiconductor wafer W is finally inserted into the cassette 25 at the predetermined position by operating the work ejecting/inserting means 27.

The process fluid sprayed toward the cut area from the process fluid supply nozzle 225 by the process fluid supplying means in the cutting step functions to cool the cutting blade 223 and the cut area. Thereafter, the process fluid is recovered as a waste fluid and next purified by the waste fluid treating apparatus 10 provided adjacent to the cutting apparatus 2, thereby obtaining a pure water to be reused. The waste fluid treating apparatus 10 will now be described with reference to FIGS. 1 to 5.

The waste fluid treating apparatus 10 has a unit housing 100, and various components of the waste fluid treating apparatus 10 are provided in the unit housing 100. The components of the waste fluid treating apparatus 10 will now be described with reference to FIG. 2.

Figure 2:
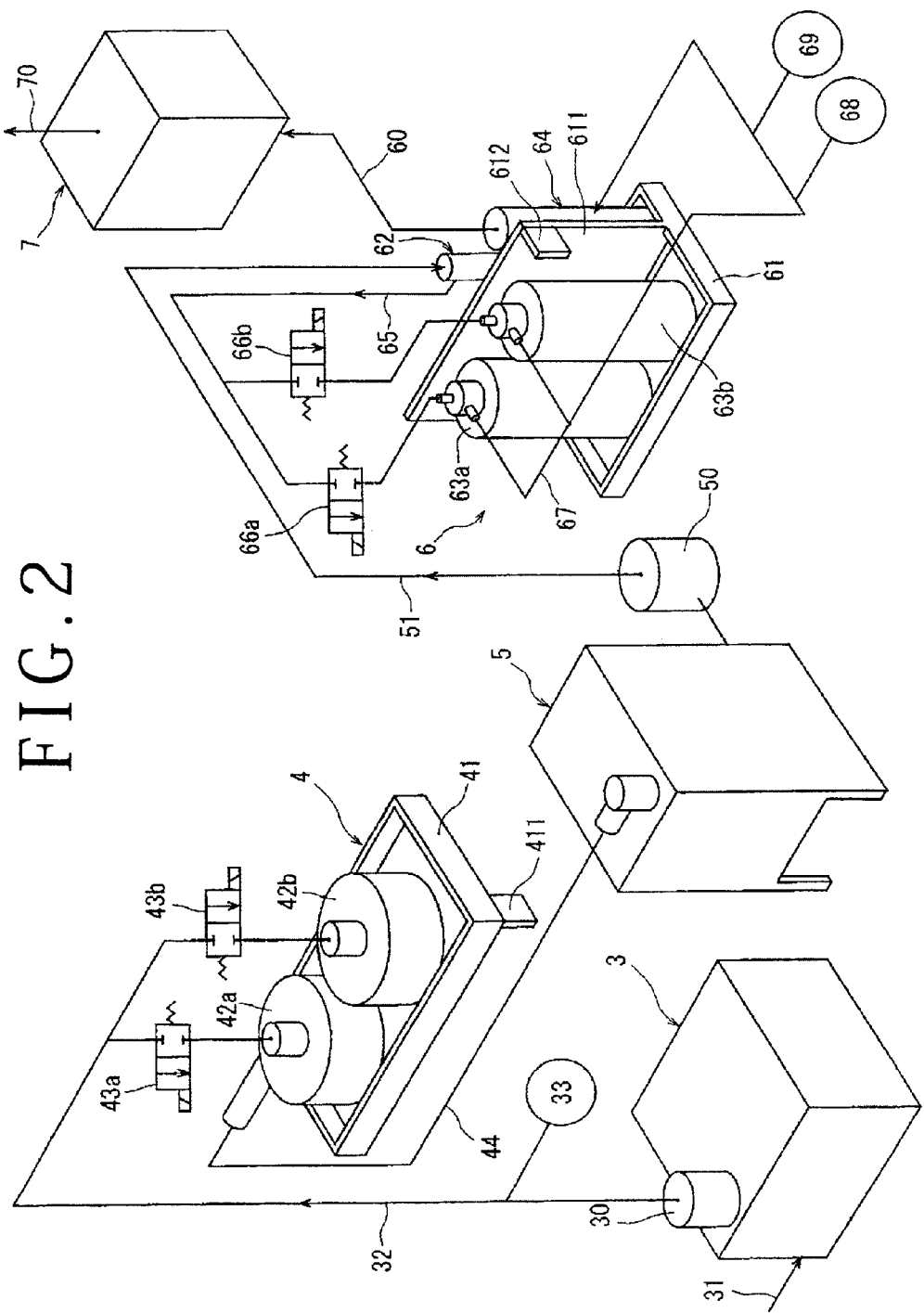
FIG. 2 is a schematic diagram of the flow of a waste fluid passing through the components of the waste fluid treating apparatus shown in FIG. 1.

Referring to FIG. 2, there is shown a schematic diagram of the flow of the waste fluid passing through the components of the waste fluid treating apparatus 10. The waste fluid treating apparatus 10 includes a waste fluid tank 3 for storing the waste fluid due to the process fluid supplied from the process fluid supply nozzle 225 to the cutting blade 223 in the cutting apparatus 2. The waste fluid tank 3 is provided with a waste fluid pump 30 for sending out the waste fluid from the waste fluid tank 3. The waste fluid tank 3 is connected through a pipe 31 to waste fluid sending means provided in the cutting apparatus 2. Accordingly, the waste fluid sent from the waste fluid sending means in the cutting apparatus 2 is introduced through the pipe 31 into the waste fluid tank 3. The waste fluid pump 30 is provided on the upper wall of the waste fluid tank 3.

The waste fluid is next sent by the waste fluid pump 30 from the waste fluid tank 3 through a pipe 32 such as a flexible hose to waste fluid filtering means 4. The waste fluid filtering means 4 includes a fresh water pan 41, a first filter 42a provided on the fresh water pan 41, and a second filter 42b provided on the fresh water pan 41. The first and second filters 42a and 42b are detachably provided on the fresh water pan 41. The pipe 32 for connecting the waste fluid pump 30 to the first and second filters 42a and 42b is provided with electromagnetic on-off valves 43a and 43b. When the electromagnetic on-off valve 43a becomes ON to open, the waste fluid sent by the waste fluid pump 30 is introduced into the first filter 42a, whereas when the electromagnetic on-off valve 43b becomes ON to open, the waste fluid sent by the waste fluid pump 30 is introduced into the second filter 42b. The waste fluid introduced into the first or second filter 42a or 42b is filtered by the first or second filter 42a or 42b to remove chips mixed in the waste fluid, thereby obtaining a fresh water to be received by the fresh water pan 41. The fresh water pan 41 is connected through a pipe 44 such as a flexible hose to a fresh water tank 5. Accordingly, the fresh water is sent from the fresh water pan 41 through the pipe 44 to the fresh water tank 5 and stored in the fresh water tank 5.

The pipe 32 is provided with pressure detecting means 33 for detecting the pressure of the waste fluid sent to the first and second filters 42a and 42b of the waste fluid filtering means 4. A detection signal from the pressure detecting means 33 is sent to control means to be hereinafter described. When the detection signal from the pressure detecting means 33 becomes a predetermined value or more in the condition where the electromagnetic on-off valve 43a is ON to send the waste fluid to the first filter 42a, the control means determines that the chips mixed in the waste fluid are deposited on the first filter 42a to lose its filtering function. Then, the control means de-energizes the electromagnetic on-off valve 43a and energizes the electromagnetic on-off valve 43b. Further, the control means displays this change from the first filter 42a to the second filter 42b on display means provided in an operation panel to be hereinafter described. Accordingly, an operator can recognize that the first filter 42a has reached the end of its life according to the message displayed on the display means, so that the first filter 42a can be replaced by a new one. Similarly, when the detection signal from the pressure detecting means 33 becomes the predetermined value or more in the condition where the electromagnetic on-off valve 43b is ON to send the waste fluid to the second filter 42b, the control means determines that the chips mixed in the waste fluid are deposited on the second filter 42b to lose its filtering function. Then, the control means de-energizes the electromagnetic on-off valve 43b and energizes the electromagnetic on-off valve 43a. Further, the control means displays this change from the second filter 42b to the first filter 42a on the display means.

The fresh water sent from the waste fluid filtering means 4 through the pipe 44 and stored in the fresh water tank 5 is next sent by a fresh water pump 50 through a pipe 51 such as a flexible hose to pure water generating means 6. The pure water generating means 6 according to the present embodiment includes a support base 61, a partition board 611, ultraviolet light applying means 62 located on the rear side of the partition board 611 on the support base 61, first and second ion exchangers 63a and 63b located so as to be juxtaposed to each other on the front side of the partition board 611 on the support base 61, and a micro-filter 64 located so as to be juxtaposed to the ultraviolet light applying means 62 on the rear side of the partition board 611 on the support base 61. The first and second ion exchangers 63a and 63b and the micro-filter 64 are detachably provided on the support base 61. The fresh water sent from the fresh water tank 5 through the pipe 51 by the fresh water pump 50 is introduced into the ultraviolet light applying means 62 for the purpose of sterilization. The fresh water thus sterilized by the ultraviolet light applying means 62 is next introduced through a pipe 65 to the first ion exchanger 63a or the second ion exchanger 63b. The pipe 65 is provided with electromagnetic on-off valves 66a and 66b.

When the electromagnetic on-off valve 66a becomes ON to open, the fresh water from the ultraviolet light applying means 62 is introduced into the first ion exchanger 63a, whereas when the electromagnetic on-off valve 66b becomes ON to open, the fresh water from the ultraviolet light applying means 62 is introduced into the second ion exchanger 63b. The fresh water introduced into the first or second ion exchanger 63a or 63b is subjected to ion exchange, thereby obtaining a pure water. There is a case that the pure water may contain a minute substance such as resin dust due to the ion exchange resins constituting the first and second ion exchangers 63a and 63b. Accordingly, the pure water generated by the first or second ion exchanger 63a or 63b is next introduced through a pipe 67 to the micro-filter 64 to remove the minute substance such as resin dust due to the ion exchange resins contained in the pure water.

The pipe 67 is provided with pressure detecting means 68 for detecting the pressure of the pure water sent from the first or second ion exchanger 63a or 63b to the micro-filter 64. A detection signal from the pressure detecting means 68 is sent to the control means. When the detection signal from the pressure detecting means 68 becomes a predetermined value or more, the control means determines that the minute substance such as resin dust is deposited on the micro-filter 64 to lose its filtering function, and displays this result on the display means of the operation panel. Then, the operator can recognize that the micro-filter 64 has reached the end of its life according to the message displayed on the display means, so that the micro-filter 64 can be replaced by a new one.

The pipe 67 is further provided with a resistivity meter 69 for detecting the resistivity of the pure water sent from the first or second ion exchanger 63a or 63b to the micro-filter 64. A detection signal from the resistivity meter 69 is sent to the control means which will be described later. When the detection signal from the resistivity meter 69 becomes a predetermined value (e.g., 14 MΩ·cm) or less in the condition where the electromagnetic on-off valve 66a is ON to send the fresh water to the first ion exchanger 63a, the control means determines that the water purifying power of the first ion exchanger 63a is lowered and then de-energizes the electromagnetic on-off valve 66a, whereas energizing the electromagnetic on-off valve 66b. Further, the control means displays this change from the first ion exchanger 63a to the second ion exchanger 63b on the display means of the operation panel.

The operator can recognize that the first ion exchanger 63a has reached the end of its life according to the message displayed on the display means, so that the ion exchange resin in the first ion exchanger 63a can be replaced by a new one. Similarly, when the detection signal from the resistivity meter 69 becomes the predetermined value (e.g. 14 MΩ·cm) or less in the condition where the electromagnetic on-off valve 66b is ON to send the fresh water to the second ion exchanger 63b, the control means determines that the water purifying power of the second ion exchanger 63b is lowered and then de-energizes the electromagnetic on-off valve 66b, whereas energizing the electromagnetic on-off valve 66a. Further, the control means displays this change from the second ion exchanger 63b to the first ion exchanger 63a on the display means of the operation panel.

The pure water generated by the pure water generating means 6 is next sent through a pipe 60 such as a flexible hose to pure water temperature adjusting means 7. The temperature of the pure water sent to the pure water temperature adjusting means 7 is adjusted to a predetermined temperature (e.g., 23° C.) in the pure water temperature adjusting means 7. The pure water is next sent back through a pipe 70 to the process fluid supplying means in the cutting apparatus 2.

Figure 3:
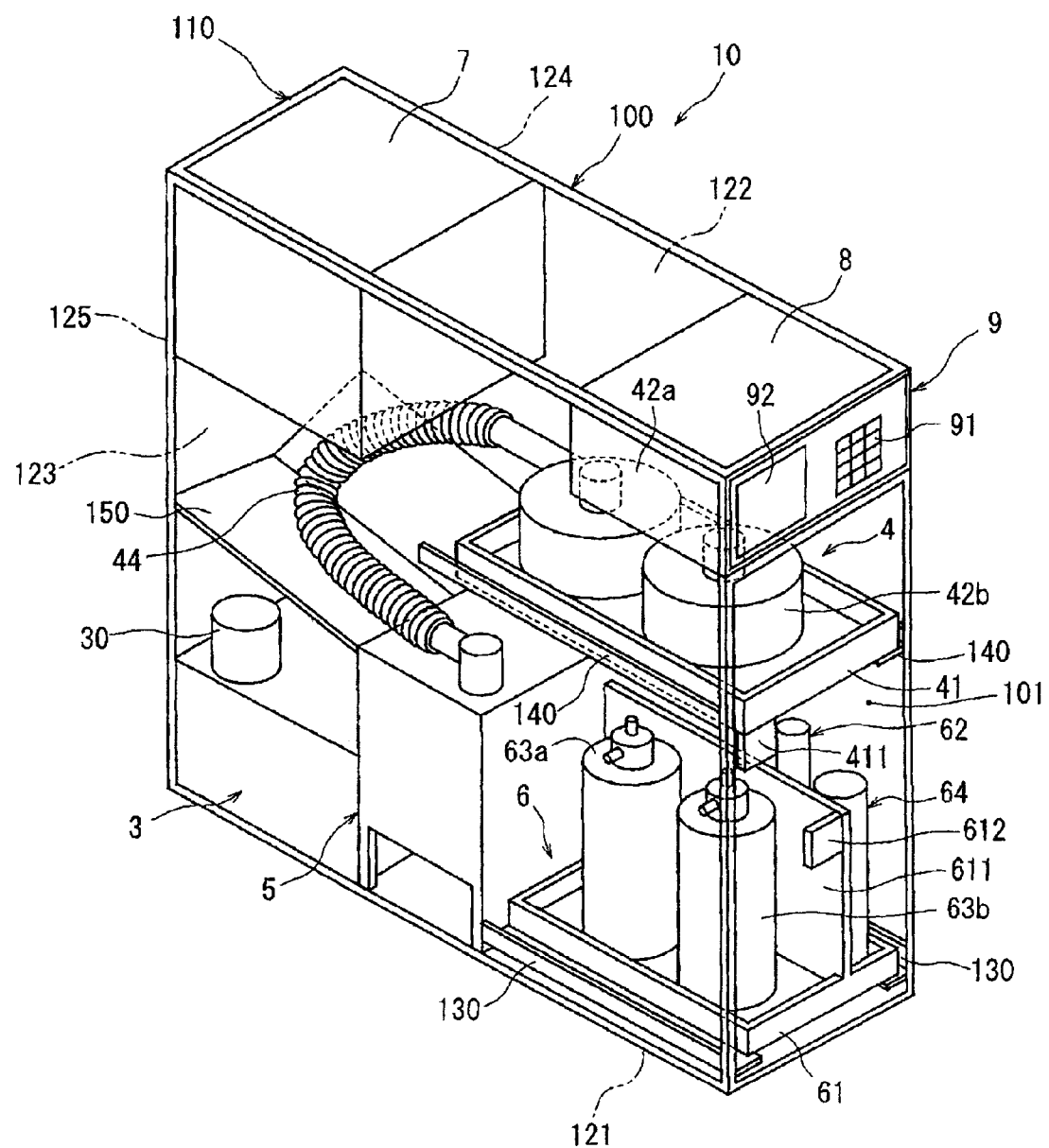
FIG. 3 is a perspective view showing the arrangement of the components of the waste fluid treating apparatus with the walls of a unit housing shown in FIG. 1 removed for purposes of illustration.

All of the waste fluid tank 3, the waste fluid filtering means 4, the fresh water tank 5, the pure water generating means 6, the pure water temperature adjusting means 7, and the related pipes mentioned above are contained in the unit housing 100 shown in FIGS. 1 and 3. FIG. 3 shows the arrangement of these components 3, 4, 5, 6, and 7 with the walls of the unit housing 100 removed for purposes of illustration. The unit housing 100 includes a frame 110 for forming a boxlike accommodating chamber, a bottom wall 121, an upper wall 122, a left side wall 123, a right side wall 124, a rear wall 125, and a door 126. These walls 121, 122, 123, 124, and 125 are mounted on the frame 110. The door 126 is pivotably mounted on the front side of the frame 110 so as to normally close a front opening 101 formed on the front side of the frame 110.

The waste fluid tank 3, the fresh water tank 5, and the pure water generating means 6 are provided on the bottom wall 121 of the unit housing 100. The waste fluid tank 3 is located adjacent to the rear wall 125 of the unit housing 100. The fresh water tank 5 is located adjacent to the waste fluid tank 3 at a central position on the bottom wall 121. The pure water generating means 6 is located adjacent to the fresh water tank 5 so as to be exposed to the front opening 101 of the unit housing 100 (i.e., adjacent to the door 126).

The pure water generating means 6 can be drawn out through the front opening 101 of the unit housing 100. More specifically, a pair of guide rails 130 are provided on the inner surfaces of the left side wall 123 and the right side wall 124 at their lower end portions. The guide rails 130 extend parallel to each other and also parallel to the upper surface of the bottom wall 121 in the longitudinal direction of the unit housing 100. The support base 61 of the pure water generating means 6 is placed on the guide rails 130, so that the pure water generating means 6 is supported to the guide rails 130 so as to be drawable through the front opening 101 along the guide rails 130. Accordingly, by drawing the pure water generating means 6 through the front opening 101 along the guide rails 130, it is possible to easily replace the first and second ion exchangers 63a and 63b and the micro-filter 64 detachably provided on the support base 61.

Further, the waste fluid filtering means 4 is located above the pure water generating means 6 and the fresh water tank 5 so as to be drawable through the front opening 101. More specifically, a pair of guide rails 140 are provided on the inner surfaces of the left side wall 123 and the right side wall 124 at their vertically central portions. The guide rails 140 extend parallel to each other and also parallel to the upper surface of the bottom wall 121 (parallel to the guide rails 130) in the longitudinal direction of the unit housing 100. The fresh water pan 41 of the waste fluid filtering means 4 is placed on the guide rails 140, so that the waste fluid filtering means 4 is supported to the guide rails 140 so as to be drawable through the front opening 101 along the guide rails 140. A tab 411 for facilitating the drawing operation of the waste fluid filtering means 4 projects downward from the front end of the fresh water pan 41. Accordingly, by drawing the waste fluid filtering means 4 through the front opening 101 along the guide rails 140, it is possible to easily replace the first and second filters 42a and 42b detachably provided on the fresh water pan 41. To allow the drawing operation of the waste fluid filtering means 4, the pipe 44 connecting the fresh water pan 41 to the fresh water tank 5 is formed from a flexible hose in this preferred embodiment.

In relation to the connection of the fresh water pan 41 and the fresh water tank 5 through a flexible hose as the pipe 44, a hose support plate 150 for supporting the pipe 44 is provided on the rear wall 125 side of the waste fluid filtering means 4. More specifically, the hose support plate 150 is inclined upward toward the rear wall 125 and also inclined upward toward the right side wall 124. Accordingly, the hose support plate 150 can prevent downward curving of the pipe 44 due to its own weight, and can maintain the inlet end of the pipe 44 at a higher position. As a result, the fresh water can be made to naturally flow from the fresh water pan 41 through the pipe 44 to the fresh water tank 5 due to its own weight.

The pure water temperature adjusting means 7 is located above the hose support plate 150. More specifically, support members (not shown) are mounted on the left side wall 123 and the right side wall 124. The pure water temperature adjusting means 7 is placed on these support members and fixed by any suitable fixing means.

The waste fluid treating apparatus 10 further includes control means 8 for controlling the operation of the various components mentioned above and an operation panel 9 for inputting treatment information such as waste fluid treatment start information. The control means 8 and the operation panel 9 are integrated and they are located above the waste fluid filtering means 4 as shown in FIG. 3. More specifically, support members (not shown) are mounted on the left side wall 123 and the right side wall 124. The control means 8 and the operation panel 9 are placed on these support members and fixed by any suitable fixing means. The operation panel 9 is located on the front side of the unit housing 100 (i.e., just above the door 126). The operation panel 9 is provided with input means 91 for inputting treatment information or the like and display means 92 for displaying the treatment information processed by the control means 8.

The first and second ion exchangers 63a and 63b will now be described with reference to FIGS. 4 and 5. The first and second ion exchangers 63a and 63b have the same configuration, so that FIGS. 4 and 5 show first and second preferred embodiments of a common ion exchanger 63.

Figure 4:
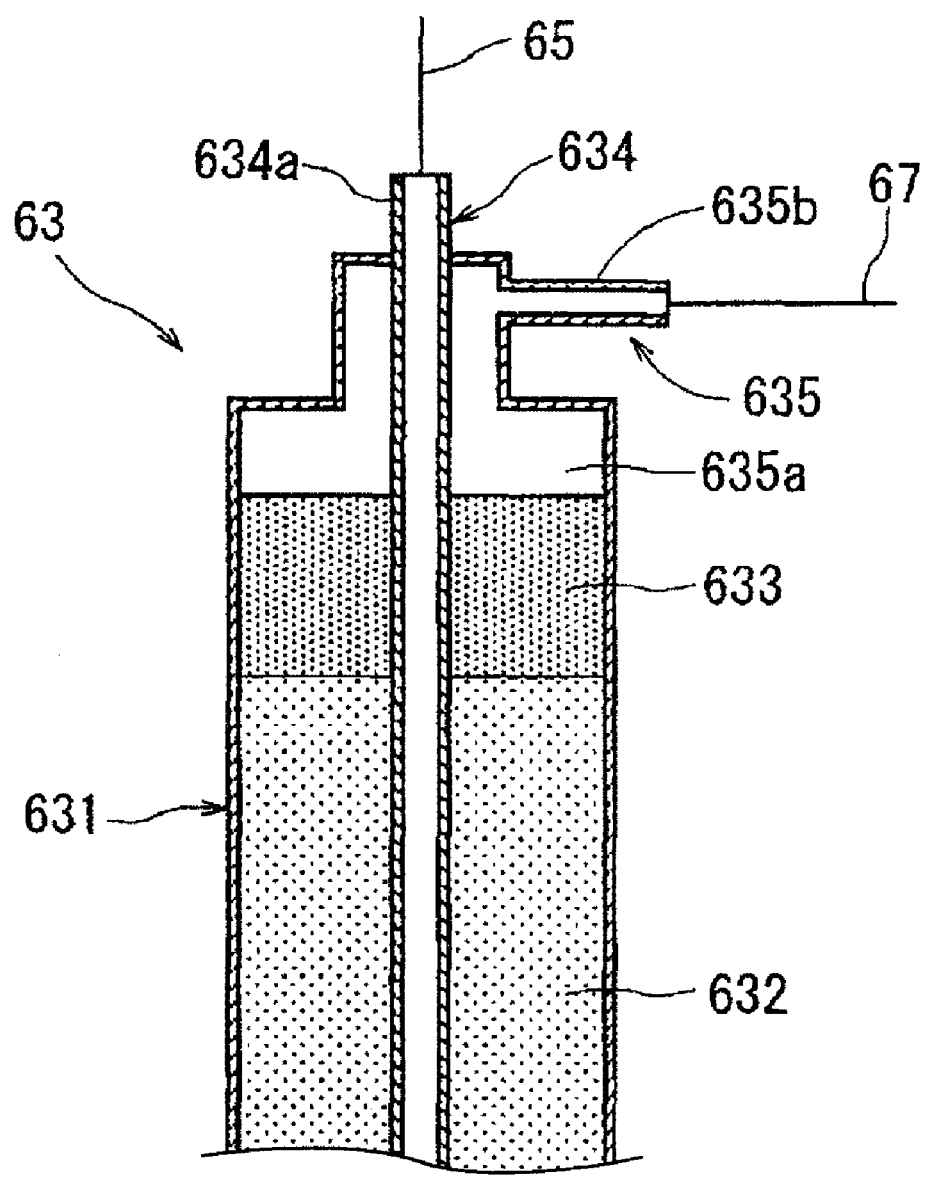
FIG. 4 is a sectional view showing a first preferred embodiment of an ion exchanger constituting pure water generating means of the waste fluid treating apparatus shown in FIG. 2.
Figure 5:
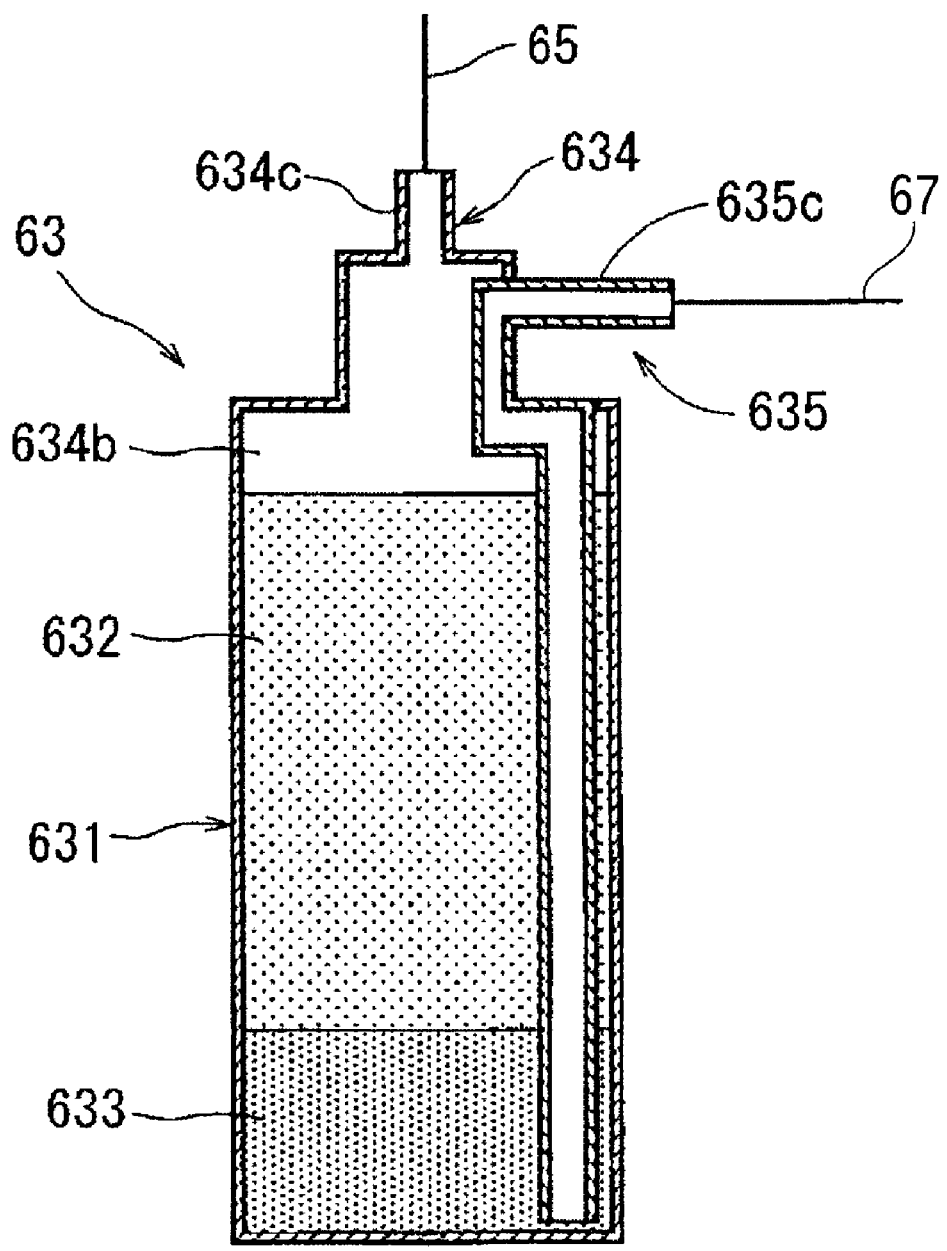
FIG. 5 is a sectional view showing a second preferred embodiment of the ion exchanger.

The ion exchanger 63 according to the first preferred embodiment shown in FIG. 4 includes a housing 631, an anion exchange resin layer 632 contained in the housing 631, and a mixed resin layer 633 contained in the housing 631 above the anion exchange resin layer 632. The anion exchange resin layer 632 is composed of only anion exchange resin, and the mixed resin layer 633 is composed of a mixture of anion exchange resin and cation exchange resin. As shown in FIG. 4, the anion exchange resin layer 632 forms a lower layer in the housing 631, and the mixed resin layer 633 forms an upper layer above the anion exchange resin layer 632. The housing 631 is provided with fresh water inlet means 634 for introducing the fresh water into the anion exchange resin layer 632 and pure water outlet means 635 for discharging the pure water from the mixed resin layer 633. The fresh water inlet means 634 is provided by a fresh water inlet pipe 634a extending through the upper wall of the housing 631. The lower end of the fresh water inlet pipe 634a is open to the lower portion of the anion exchange resin layer 632, and the upper end of the fresh water inlet pipe 634a is connected to the pipe 65. The pure water outlet means 635 is provided by a pure water chamber 635a defined in an upper space of the housing 631 above the mixed resin layer 633 and a pure water outlet port 635b opening to the pure water chamber 635a. The pure water outlet port 635b is connected to the pipe 67.

Then, the ion exchanger 63 according to the second preferred embodiment will be described with reference to FIG. 5. Like the ion exchanger 63 shown in FIG. 4, the ion exchanger 63 according to the second preferred embodiment shown in FIG. 5 includes a housing 631, an anion exchange resin layer 632 contained in the housing 631, and a mixed resin layer 633 contained in the housing 631 below the anion exchange resin layer 632. The anion exchange resin layer 632 is composed of only anion exchange resin, and the mixed resin layer 633 is composed of a mixture of anion exchange resin and cation exchange resin. As shown in FIG. 5, the mixed resin layer 633 forms a lower layer in the housing 631, and the anion exchange resin layer 632 forms an upper layer above the mixed resin layer 633. The housing 631 is provided with fresh water inlet means 634 for introducing the fresh water into the anion exchange resin layer 632 and pure water outlet means 635 for discharging the pure water from the mixed resin layer 633. The fresh water inlet means 634 is provided by a fresh water chamber 634b defined in an upper space of the housing 631 above the anion exchange resin layer 632 and a fresh water inlet port 634c opening to the fresh water chamber 634b. The fresh water inlet port 634c is connected to the pipe 65. The pure water outlet means 635 is provided by a pure water outlet pipe 635c extending along the side wall of the housing 631. The lower end of the pure water outlet pipe 635c is open to the lower portion of the mixed resin layer 633, and the upper end of the pure water outlet pipe 635c is connected to the pipe 67.

As described above, each ion exchanger 63 shown in FIGS. 4 and 5 includes the anion exchange resin layer 632 composed of only anion exchange resin and the mixed resin layer 633 composed of a mixture of anion exchange resin and cation exchange resin. Further, the fresh water is introduced into the anion exchange resin layer 632, and the pure water is discharged from the mixed resin layer 633. Accordingly, the waste fluid generated by cutting or grinding a semiconductor containing more anions can be effectively converted into the pure water, and the life of the ion exchanger 63 can be extended.

The present inventors prepared a mixture of anion exchange resin and cation exchange resin in a weight ratio of 3:2, and used a mixed resin layer composed of this mixture and an anion exchange resin layer composed of only this anion exchange resin to prepare the following four kinds of ion exchangers by changing the weight ratio of the mixed resin layer and the anion exchange resin layer.

No. 1: The weight of the mixed resin layer is 350 g, and the weight of the anion exchange resin layer is 0 g (the weight ratio of the anion exchange resin forming the anion exchange resin layer and the mixture forming the mixed resin layer is 0:100).

No. 2: The weight of the mixed resin layer is 210 g, and the weight of the anion exchange resin layer is 140 g (the weight ratio of the anion exchange resin forming the anion exchange resin layer and the mixture forming the mixed resin layer is 2:3).

No. 3: The weight of the mixed resin layer is 140 g, and the weight of the anion exchange resin layer is 210 g (the weight ratio of the anion exchange resin forming the anion exchange resin layer and the mixture forming the mixed resin layer is 3:2).

No. 4: The weight of the mixed resin layer is 70 g, and the weight of the anion exchange resin layer is 280 g (the weight ratio of the anion exchange resin forming the anion exchange resin layer and the mixture forming the mixed resin layer is 4:1).

Figure 6:
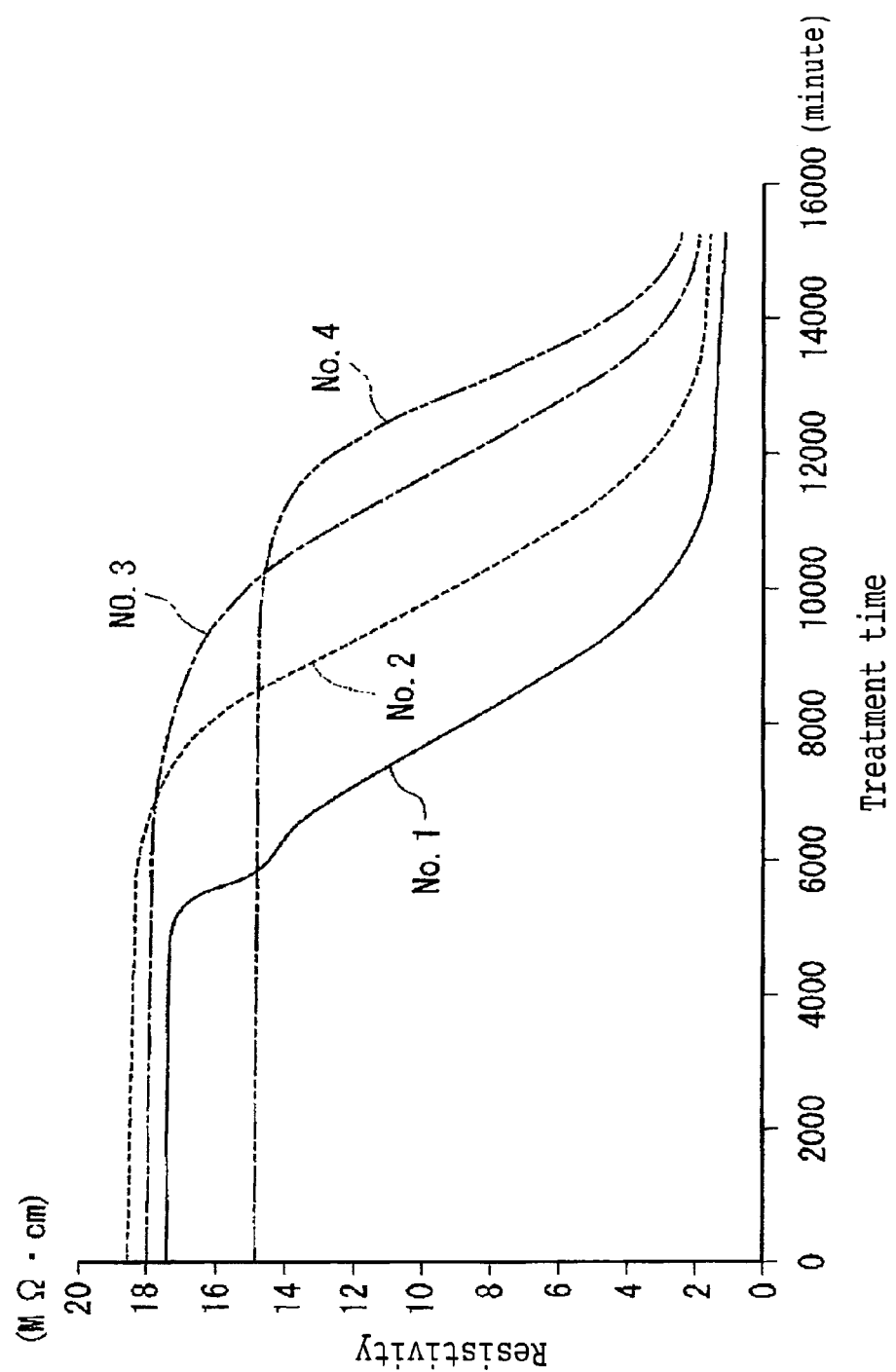
FIG. 6 is a graph showing the results of measurement of the treatment time and the resistivity of water discharged from ion exchangers according to the present invention and a conventional ion exchanger.

A cutting waste water was introduced at the rate of 1 liter per minute into the above four kinds of ion exchangers, and the resistivity of the water discharged from these ion exchangers was measured. The results of this measurement are shown in FIG. 6. In FIG. 6, the horizontal axis represents the treatment time (minutes) for the cutting waste water by each ion exchanger, and the vertical axis represents the resistivity (MΩ·cm) of the water discharged from each ion exchanger. When the resistivity of the water discharged from each ion exchanger is 14 MΩ·cm or more, this discharged water can be reused as a pure water.

As apparent from FIG. 6, in the No. 1 ion exchanger, i.e., a conventional ion exchanger provided by only the mixed resin layer with the weight ratio of the anion exchange resin and the cation exchange resin set to 3:2, the resistivity of the water becomes equal to or lower than 14 MΩ·cm after a treatment time of about 6000 minutes. In the No. 2 ion exchanger, the resistivity of the water is maintained at 14 MΩ·cm after a treatment time of about 9000 minutes. In the No. 3 ion exchanger, the resistivity of the water is maintained at 14 MΩ·cm after a treatment time of about 11000 minutes. In the No. 4 ion exchanger, the resistivity of the water is maintained at 14 MΩ·cm after a treatment time of about 12000 minutes. According to the present invention, the ion exchanger includes the anion exchange resin layer composed of only anion exchange resin and the mixed resin layer composed of a mixture of anion exchange resin and cation exchange resin. Further, the fresh water is introduced into the anion exchange resin layer, and the pure water is discharged from the mixed resin layer. Accordingly, as compared with the conventional ion exchanger composed of only the mixed resin layer, the life of the ion exchanger according to the present invention can be extended 50% or more. In particular, by setting the weight ratio of the anion exchange resin forming the anion exchange resin layer and the mixture forming the mixed resin layer to 3:2 to 4:1, the life of the ion exchanger according to the present invention can be extended about twice the life of the conventional ion exchanger composed of only the mixed resin layer.

While the waste fluid treating apparatus according to the present invention is applied to the cutting apparatus for cutting the semiconductor wafer along the streets in this preferred embodiment, similar effects can be obtained also in the case of applying the waste fluid treating apparatus according to the present invention to any other processing apparatuses such as a grinding apparatus for grinding the back side of a semiconductor wafer to reduce the thickness thereof to a predetermined thickness.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A waste fluid treating apparatus comprising:
    a waste fluid tank for storing a waste fluid generated from a process fluid supplied in processing by a processing apparatus;
    a waste fluid pump for sending said waste fluid stored in said waste fluid tank;
    waste fluid filtering means for filtering said waste fluid sent by said waste fluid pump to obtain a fresh water;
    a fresh water tank for storing said fresh water obtained by said waste fluid filtering means;
    a fresh water pump for sending said fresh water stored in said fresh water tank; and
    pure water generating means including an ion exchanger for purifying said fresh water sent by said fresh water pump to obtain a pure water;
    said ion exchanger comprising a housing, an anion exchange resin layer accommodated in said housing, and a mixed resin layer accommodated in said housing, said anion exchange resin layer being composed of only anion exchange resin, said mixed resin layer being composed of a mixture of anion exchange resin and cation exchange resin;
    said housing being provided with fresh water inlet means for introducing said fresh water into said anion exchange resin layer and pure water outlet means for discharging said pure water from said mixed resin layer.

2. The waste fluid treating apparatus according to claim 1, wherein the weight ratio of said anion exchange resin forming said anion exchange resin layer and said mixture forming said mixed resin layer is set to 3:2 to 4:1.

3. The waste fluid treating apparatus according to claim 2, wherein the weight ratio of said anion exchange resin and said cation exchange resin forming said mixed resin layer is set to 3:2.

* * * * *